US012557900B2

(12) United States Patent (10) Patent No.: US 12,557,900 B2
Ahn et al. (45) Date of Patent: Feb. 24, 2026

(54) ACCESSORY FOR PORTABLE DEVICE

(71) Applicant: SINJIMORU CO., LTD., Seoul (KR)

(72) Inventors: Mi Jung Ahn, Gwangmyeong-si (KR);
Joon Ho Sung, Yongin-si (KR); **Bum
Pil Lee**, Seoul (KR)

(73) Assignee: SINJIMORU CO., LTD., Seoul (KR)

( * ) Notice: Subject to any disclaimer, the term of this
patent is extended or adjusted under 35
U.S.C. 154(b) by 0 days.

(21) Appl. No.: 19/182,131

(22) Filed: Apr. 17, 2025

(65) Prior Publication Data

US 2025/0241431 A1 Jul. 31, 2025

Related U.S. Application Data

(63) Continuation of application No.
PCT/KR2023/018672, filed on Nov. 20, 2023.

(30) Foreign Application Priority Data

Nov. 22, 2022 (KR) ........................ 10-2022-0157174
Dec. 31, 2022 (WO) ................................ 970167631
Jul. 26, 2023 (KR) ........................ 10-2023-0097786

(51) Int. Cl.
*A45F 5/10* (2006.01)
*A45F 5/00* (2006.01)
*F16M 13/00* (2006.01)
(52) U.S. Cl.
CPC .............. *A45F 5/10* (2013.01); *A45F 5/1516*
(2025.01); *A45F 5/1525* (2025.01); *F16M
13/005* (2013.01)
(58) Field of Classification Search
CPC ........ A45F 5/1525; A45F 5/1516; A45F 5/10;
F16M 13/005; H04M 1/04

(Continued)

(56) References Cited

U.S. PATENT DOCUMENTS 8,186,642 B2 * 5/2012 Weiss-Vons ............ F16B 47/00
248/205.8
8,560,031 B2 * 10/2013 Barnett .................. F16M 11/10
455/575.8

(Continued)

FOREIGN PATENT DOCUMENTS

CN 211908882 U 11/2020
CN 217240730 U 8/2022

(Continued)

OTHER PUBLICATIONS

International Search Report dated Feb. 29, 2024 issued in PCT/
KR2023/018672.

(Continued)

*Primary Examiner* — Ingrid M Weinhold
(74) *Attorney, Agent, or Firm* — Scully, Scott, Murphy &
Presser, P.C.

(57) ABSTRACT

An accessory for a portable device including: a coupling unit
attachable to one surface of a portable device or one surface
of a casing that surrounds the portable device; an elastic
transformation member connected to the coupling unit; and
a cover unit connected to the elastic transformation member
and configured such that a distance between the cover unit
and the coupling unit is increased or decreased in accor-
dance with elastic transformation of the elastic transforma-
tion member. The elastic transformation member includes: a
first cone-shaped part disposed close to the coupling unit and
having a side surface formed as a convex curved surface; a
second cone-shaped part disposed close to the cover unit and
having a side surface formed as a convex curved surface;
and a connecting part configured to connect the first cone-
shaped part and the second cone-shaped part.

18 Claims, 8 Drawing Sheets

(58) Field of Classification Search
USPC .......................................................... 248/688
See application file for complete search history.

(56) References Cited

U.S. PATENT DOCUMENTS

| | | | | |
|---|---|---|---|---|
| D794,607 | S | * | 8/2017 | Srour ............................. D3/218 |
| 9,787,348 | B2 | * | 10/2017 | Srour .................. H04R 1/1033 |
| 10,244,854 | B1 | * | 4/2019 | Haber .................... H04B 1/385 |
| 10,348,352 | B2 | * | 7/2019 | Barnett .................. F16M 13/04 |
| 10,463,116 | B2 | * | 11/2019 | Barnett ............... A44B 99/005 |
| 10,721,343 | B2 | * | 7/2020 | Nahum ............... F16M 11/041 |
| 10,806,552 | B1 | * | 10/2020 | Demoss ................. A45C 15/00 |
| 11,320,089 | B2 | † | 5/2022 | Fabec |
| D977,470 | S | * | 2/2023 | Mizrahi ....................... D14/251 |
| 11,689,237 | B2 | * | 6/2023 | Kim ...................... H04M 1/026 455/575.1 |
| 11,744,353 | B1 | * | 9/2023 | Staten ....................... A45F 5/00 294/26 |
| D1,062,716 | S | * | 2/2025 | Dana ............................ D14/253 |
| 12,238,233 | B1 | * | 2/2025 | Durfee, Jr. .......... H04M 1/0281 |
| 12,301,746 | B1 | * | 5/2025 | Durfee, Jr. .......... H04M 1/0281 |
| 2017/0195000 | A1 | * | 7/2017 | Srour .................. H04R 1/1033 |
| 2018/0066791 | A1 | | 3/2018 | Hobbs et al. |
| 2019/0089822 | A1 | * | 3/2019 | Gartz ...................... F16M 11/40 |
| 2019/0211966 | A1 | * | 7/2019 | Nahum ................. G06F 1/1656 |
| 2019/0245960 | A1 | * | 8/2019 | Nahum ................. A45F 5/1533 |
| 2019/0335031 | A1 | * | 10/2019 | Nahum ............... F16M 11/041 |
| 2020/0037737 | A1 | * | 2/2020 | Cantoli-Alves ...... H04B 1/3888 |
| 2020/0217449 | A1 | * | 7/2020 | Barnett ................ A45C 11/002 |
| 2020/0326030 | A1 | * | 10/2020 | Surani .................. G06F 1/1632 |
| 2020/0329133 | A1 | * | 10/2020 | Surani ..................... H04M 1/04 |
| 2021/0345763 | A1 | * | 11/2021 | Ramirez ................... A45F 5/10 |
| 2022/0116491 | A1 | * | 4/2022 | Chiang ................. F16M 11/40 |
| 2022/0191314 | A1 | | 6/2022 | McKay et al. |
| 2023/0065472 | A1 | * | 3/2023 | West ......................... A45F 5/00 |

FOREIGN PATENT DOCUMENTS

| | | | |
|---|---|---|---|
| KR | 20160122968 | A | 10/2016 |
| KR | 101891667 | B1 | 8/2018 |
| KR | 20200107655 | A | 9/2020 |
| KR | 20210042002 | A | 4/2021 |
| KR | 102301971 | B1 | 9/2021 |
| KR | 102413763 | B1 | 6/2022 |
| KR | 20220121163 | A | 8/2022 |
| WO | 2022232384 | A1 | 11/2022 |

OTHER PUBLICATIONS

Korean Office Action dated May 2, 2024 issued in 10-2022-0157174.
Notice of Allowance dated Feb. 19, 2025 issued in 10-2022-0157174.
Korean Office Action dated Sep. 5, 2024 issued in 10-2023-0097786.
The Naver shopping, and the baby mumu (May 31, 2022).
The Malang factory, and the Blue Daydream (May 28, 2022.
Office Action dated Aug. 11, 2025 received in Korean patent Application No. 10-2023-0097786.

\* cited by examiner
† cited by third party

【FIG. 1】
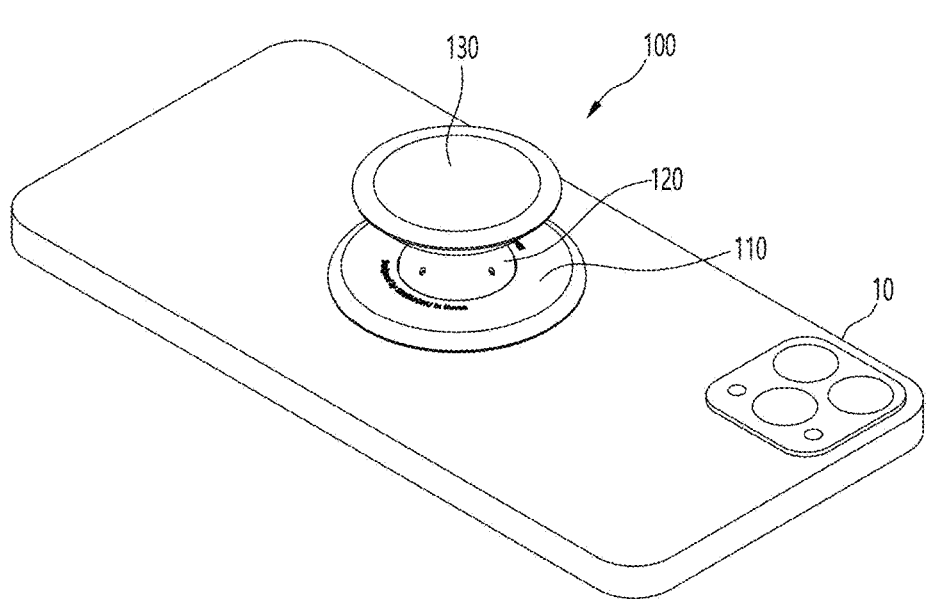
【FIG. 2】
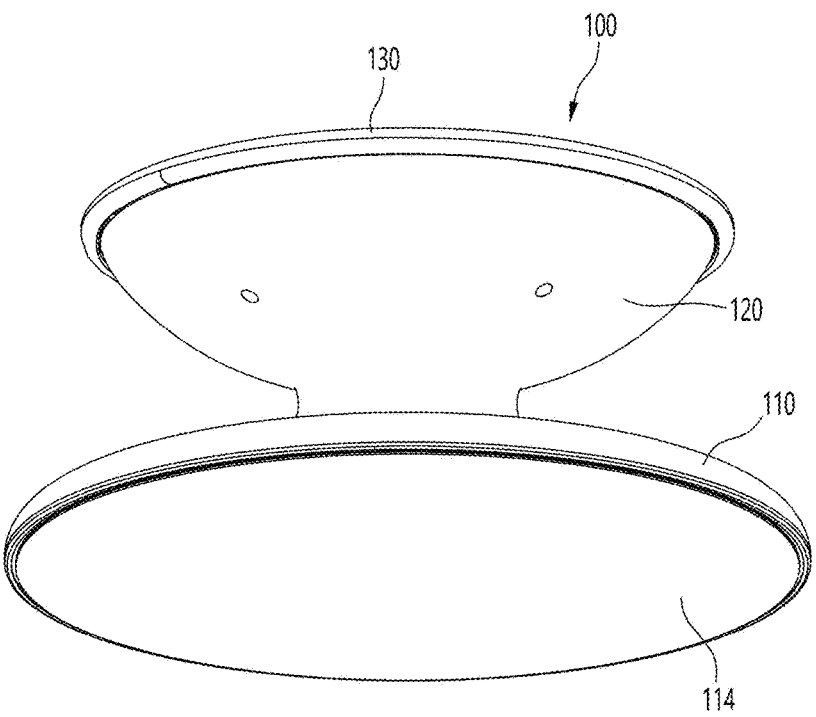

【FIG. 3】
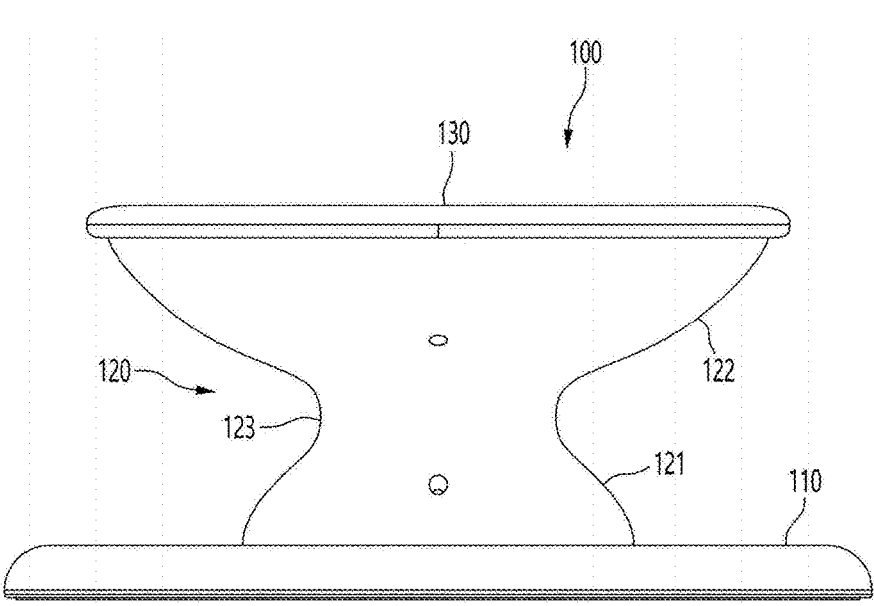
【FIG. 4】
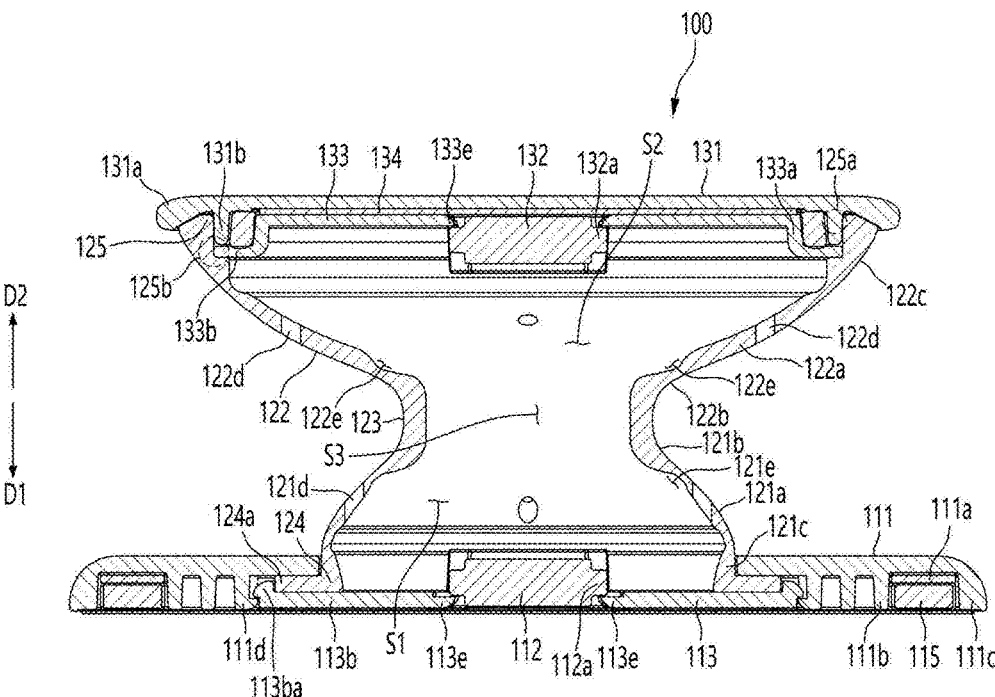

【FIG. 5】
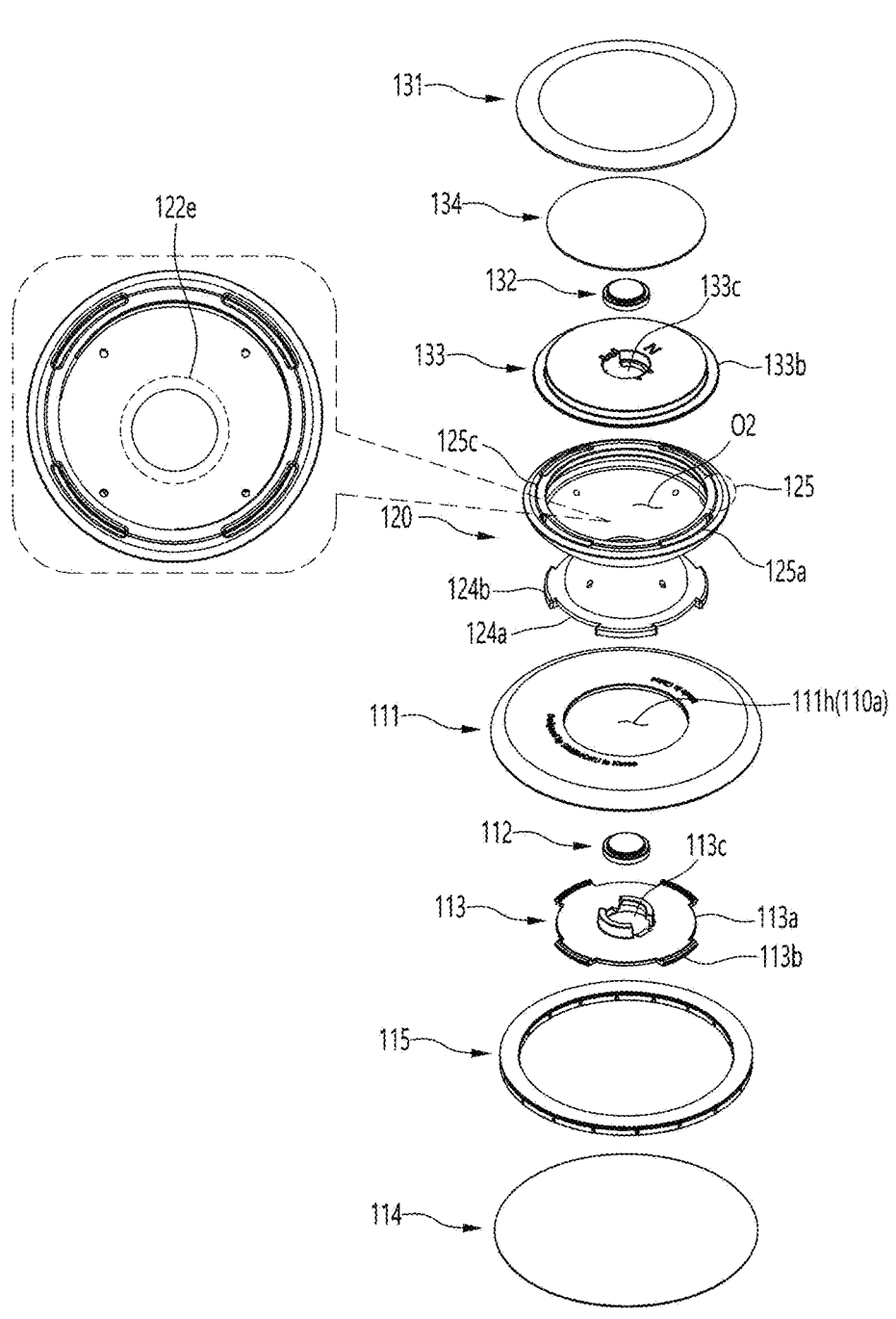

[FIG. 6]
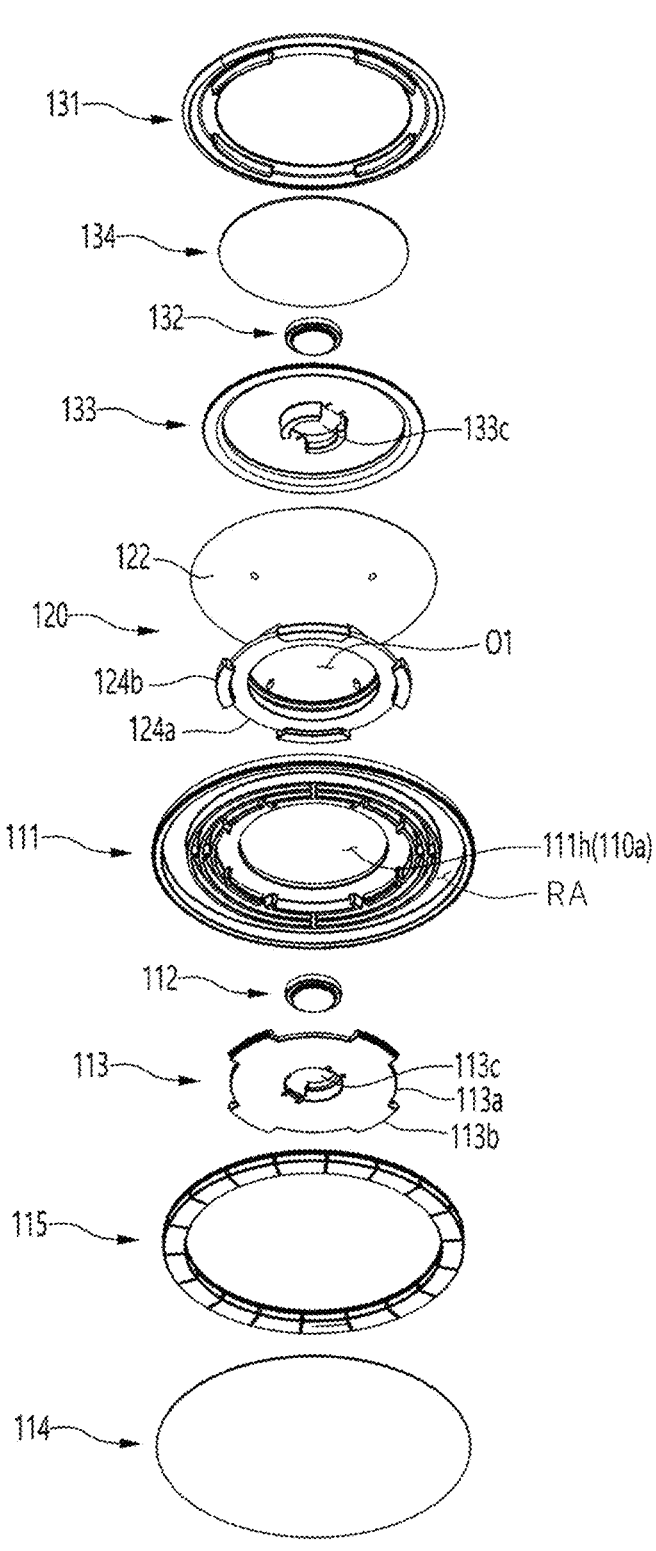

【FIG. 7】
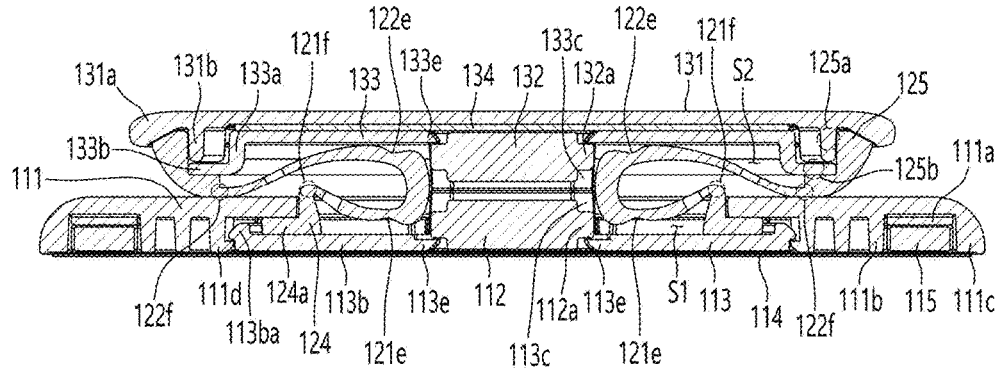
【FIG. 8】
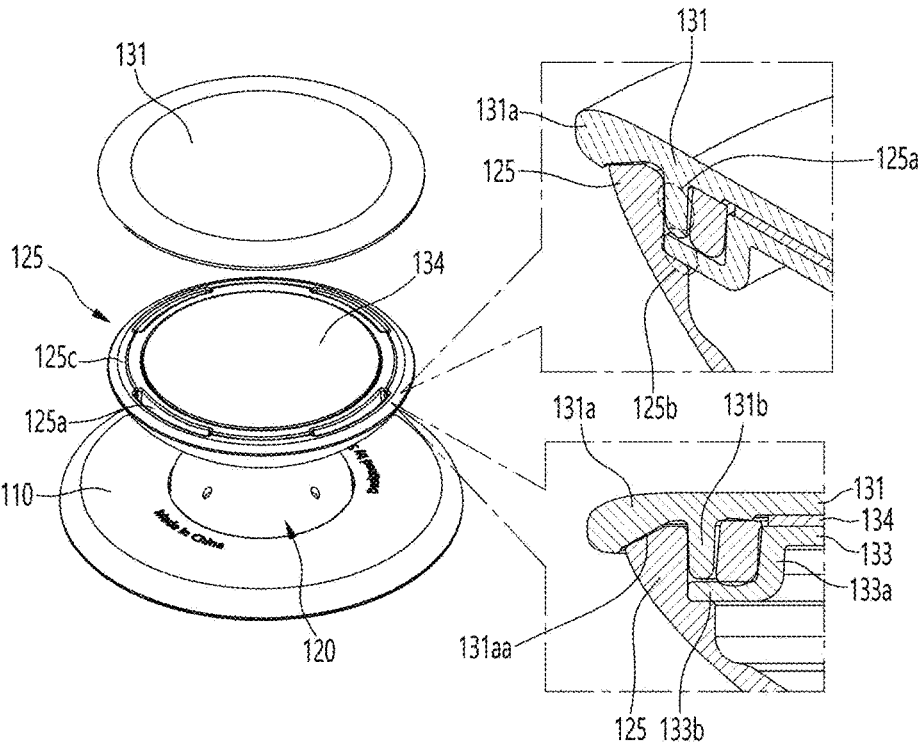

【FIG. 9】
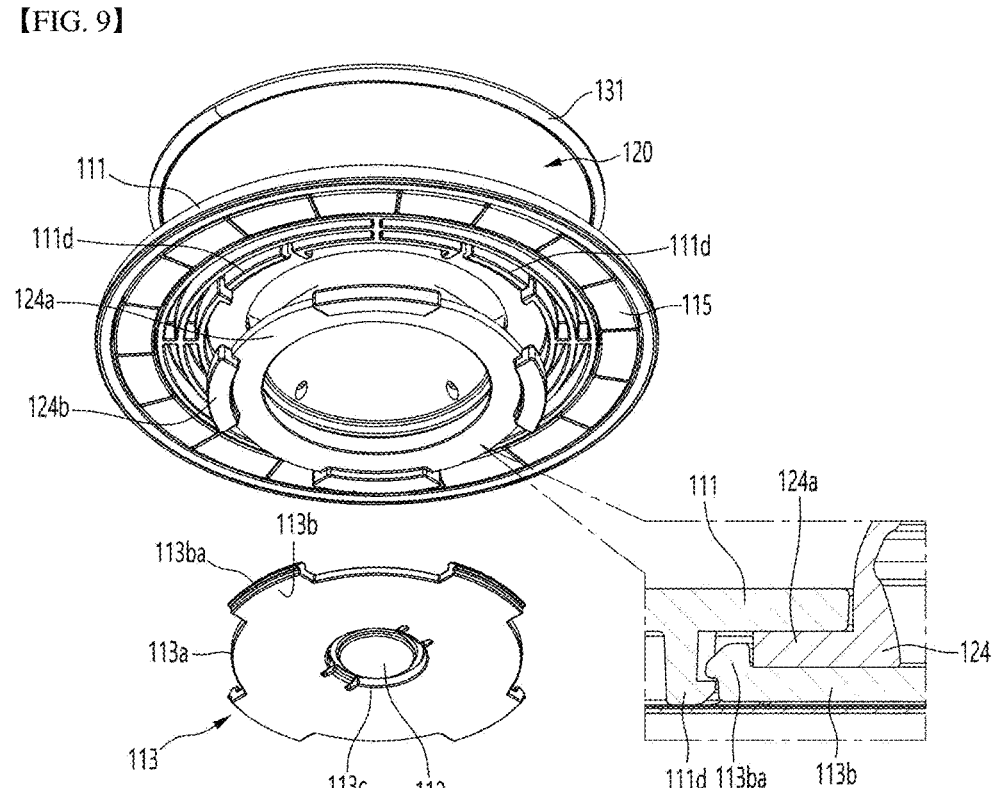

【FIG. 10】
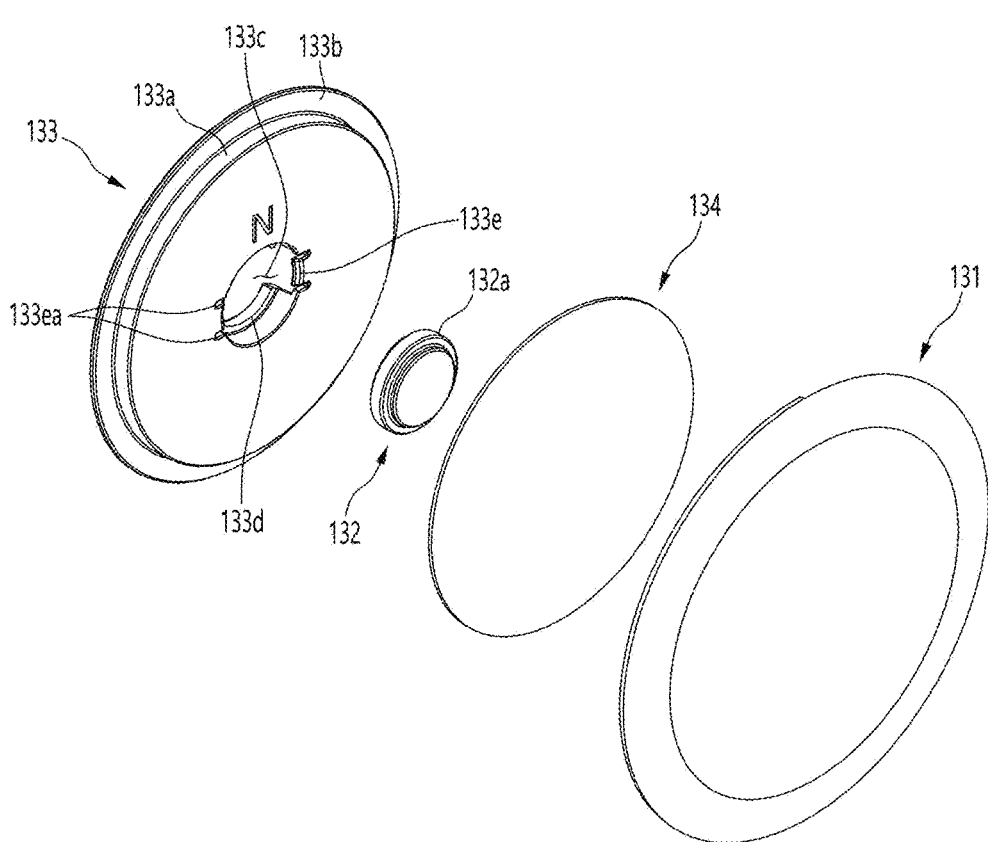

【FIG. 11】
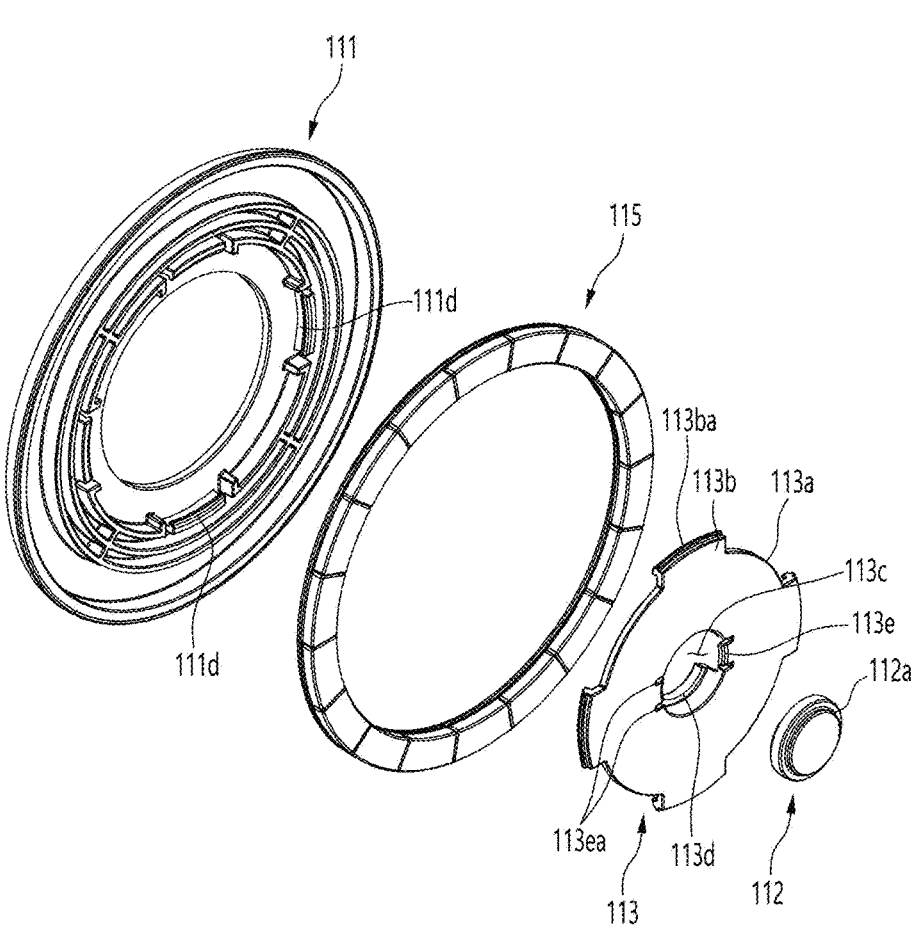

ACCESSORY FOR PORTABLE DEVICE

TECHNICAL FIELD

The present disclosure relates to an accessory for a portable device that is used by being attached to a portable device or a casing that surrounds the portable device.

BACKGROUND

With the proliferation of portable devices such as smartphones or tablet PCs, various types of accessories for portable devices have been proposed. Among the accessories, U.S. Pat. No. 8,560,031 B2 discloses an extending socket used by being attached to a portable device or a rear surface of a casing for a portable device.

In the extending socket disclosed in the patent document, a component named an accordion has rigid walls 10, 11, and 12 and a flexural hinge or living hinge 9 provided between the rigid walls, and the extending socket is extended or retracted as two opposite side walls are folded or unfolded based on the flexural hinge.

The extending socket configured as described above provides various functions. For example, in case that the portable device or the casing is intended to be carried, the extending socket may be transformed to a retracted state, such that a volume of a space occupied by the extending socket may be reduced. In addition, in case that the portable device or the casing is intended to stand sideways or grasped, the extending socket may be transformed to an extended state, thereby providing a user with a convenience function.

However, the extending socket disclosed in the patent document has the following points to be improved.

First, in case that the user intends to grasp the portable device or the casing, the user transforms the extending socket to the extended state and then disposes two fingers at two opposite sides of the accordion. However, the structure in which the rigid walls and the flexural hinge are repeatedly arranged cannot provide the user with a smooth gripping feeling because of the presence of a stepped portion.

In addition, because human fingers have shapes that curl or fold toward the palm, it is preferable to provide a structure that allows the user to grasp the portable device or the casing with the hand in the shape in which the fingers curl or fold. However, the accordion disclosed in the patent document has a tapered shape with a width that gradually decreases toward one side, such that the distal and middle knuckles of the finger are tightly attached to the portable device or the casing. Therefore, it is difficult to provide the structure that allows the user to grasp the portable device or the casing in the shape in which the fingers curl or fold.

Further, in order to increase an extension length of the extending socket, the number of times the rigid walls and the flexural hinge are repeatedly arranged needs to be increased, which causes an increase in outer diameter of a button 1 positioned at a distal end of the extending socket.

In addition, the flexural hinge or the living hinge is formed by processing a folding line, and the folding line is repeatedly folded and unfolded, which causes a deterioration in durability and tearing.

Technical Problem

A first object of the present disclosure is to provide an accessory for a portable device, the accessory being capable of providing a user with a smoother gripping feeling.

A second object of the present disclosure is to provide an accessory for a portable device, the accessory being capable of providing a user with a more comfortable gripping feeling by means of a structure that allows the user to grasp a portable device in a shape in which a human finger curls or folds.

A third object of the present disclosure is to provide an accessory for a portable device, the accessory having a structure capable of increasing an extension length while solving a problem in which an outer diameter of a component positioned at a distal end of the accessory is increased.

A fourth object of the present disclosure is to provide an accessory for a portable device, the accessory being capable of preventing a substantial deterioration in durability or tearing even though the accessory is repeatedly used.

Technical Solution

An accessory for a portable device proposed by the present disclosure comprising: a coupling unit configured to be attachable to one surface of a portable device or one surface of a casing that surrounds the portable device; an elastic transformation member connected to the coupling unit; and a cover unit connected to the elastic transformation member and configured such that a distance between the cover unit and the coupling unit is increased or decreased in accordance with elastic transformation of the elastic transformation member, wherein the elastic transformation member comprises a first cone-shaped part disposed close to the coupling unit and having a side surface formed as a convex curved surface; a second cone-shaped part disposed close to the cover unit and having a side surface formed as a convex curved surface; and a connecting part configured to connect the first cone-shaped part, and the second cone-shaped part, and wherein an outer diameter of either the first cone-shaped part or the second cone-shaped part is larger than an outer diameter of the other.

A state in which the coupling unit and the cover unit become close to each other by the elastic transformation of the elastic transformation member is defined as a retraction mode, wherein a state in which the coupling unit and the cover unit become distant from each other by the elastic transformation of the elastic transformation member is defined as an extension mode, and the side surface of at least one of the first cone-shaped part and the second cone-shaped part is elastically transformed curvedly when the elastic transformation member is transformed from the extension mode to the retraction mode.

An inflection point at which a sign of a curvature is changed occurs on the side surface of the first cone-shaped part and the side surface of the second cone-shaped part when the elastic transformation member is transformed from the extension mode to the retraction mode.

Interference prevention slit grooves are respectively formed in an inner peripheral surface of the first cone-shaped part and an inner peripheral surface of the second cone-shaped part to prevent interference with at least one of the coupling unit and the cover unit in the retraction mode.

A thickness of a cross-section of the first cone-shaped part and a thickness of a cross-section of the second cone-shaped part are smaller than those of peripheral regions thereof in regions in which the slit grooves are formed.

The slit grooves are formed as closed-curve shapes in the inner peripheral surface of the first cone-shaped part and the inner peripheral surface of the second cone-shaped part.

The slit groove is formed in a region in which the slit groove is spaced apart from the cover unit in the extension mode and moved to a position facing the cover unit when the elastic transformation member is elastically transformed to the retraction mode.

The elastic transformation member is integrally formed by injection-molding and made of a silicone material.

The second cone-shaped part covers the first cone-shaped part when the elastic transformation member is transformed to a retraction mode, in which the coupling unit and the cover unit are close in distance to each other, from an extension mode that is a state in which the coupling unit and the cover unit are distant in distance from each other.

The connecting part extends in a direction in which the coupling unit and the cover unit become close to or distant from each other, wherein two opposite ends of the connecting part are respectively connected to the first cone-shaped part and the second cone-shaped part.

A thickness of a cross-section of the connecting part is larger than a thickness of a cross-section of the first cone-shaped part or a thickness of a cross-section of the second cone-shaped part, such that the connecting part presses and elastically transforms the first cone-shaped part and the second cone-shaped part when the elastic transformation member is transformed from the extension mode to the retraction mode.

The connecting part overlaps at least one of the side surface of the first cone-shaped part and the side surface of the second cone-shaped part based on a radial direction of the elastic transformation member in a retraction mode in which the coupling unit and the cover unit are close to each other.

The connecting part overlaps the side surface of the first cone-shaped part at a relatively close position and the connecting part overlaps the side surface of the second cone-shaped part at a relatively distant position based on the radial direction of the elastic transformation member in the retraction mode.

An internal space of the elastic transformation member is divided into a first region, a second region, and a third region, wherein the first region is defined as a region surrounded by the first cone-shaped part, the second region is defined as a region surrounded by the second cone-shaped part, and the third region is defined as an internal region in the connecting part, wherein a first magnet accommodation portion is provided in the coupling unit and formed to be directed toward the first region, and a second magnet accommodation portion is provided in the cover unit and formed to be directed toward the second region.

When the elastic transformation member is transformed to a retraction mode that is a state in which the coupling unit and the cover unit are close to each other, a first magnet provided in the first magnet accommodation portion and a second magnet provided in the second magnet accommodation portion become close to each other in a range in which an attractive force is applied therebetween.

The attractive force is maintained to be applied in a state in which the first magnet and the second magnet are spaced apart from each other at a predetermined interval.

A distal part of the elastic transformation member has a shape having a hollow center based on a position from the portable device or the casing, wherein the cover unit comprises: a top mount exposed through a hollow region of the distal part of the elastic transformation member; a bonding film configured to cover an upper surface of the top mount; and a cover cap formed to have a larger outer diameter than the distal part and disposed to cover both the bonding film and the distal part.

A stepped portion bent downward is formed on a rim of the top mount, and an insertion portion formed by bending an end of the stepped portion in a radial direction is formed in the rim of the top mount, and wherein a top mount fixing groove into which the insertion portion of the top mount is inserted and fixed is formed in an inner peripheral surface of the distal part.

An outer peripheral cover portion and a cap fixing protruding portion are formed on a lower surface of a rim of the cover cap, the outer peripheral cover portion is formed as an inclined surface lowered in a radial direction to cover an entire upper end of the distal part, and formed to having a larger thickness than another portion of the cover cap, the cap fixing protruding portion protrudes toward the distal part from the inside of the outer peripheral cover portion based on the radial direction of the cover cap, wherein a cover cap fixing groove is formed in an upper portion of the distal part so that the cap fixing protruding portion is inserted into the cover cap fixing groove, and the cover cap is fixed.

The cap fixing protruding portion is provided as a plurality of cap fixing protruding portions positioned to be spaced apart from one another along a circumference of the cover cap, and wherein the cover cap fixing groove is formed to correspond to a position at which the cap fixing protruding portion is formed along the circumference of the distal part.

A second magnet accommodation portion is formed at a center of the top mount and communicates with an internal space of the elastic transformation member, wherein a second magnet inserted into the second magnet accommodation portion has a rim portion protruding between an upper end and a lower end along an outer peripheral surface in a circumferential direction.

The second magnet accommodation portion has a protrusion, wherein the protrusion extends inward from an inner peripheral surface of a lower end of the second magnet accommodation portion to fix the second magnet, and wherein the protrusion is provided as a plurality of protrusions positioned to be spaced apart from one another in a circumferential direction of the second magnet accommodation portion.

A magnet fitting portion is formed at an upper end of the second magnet accommodation portion, wherein the magnet fitting portion has a downward inclined surface formed at an end directed toward a center of the top mount to guide insertion of the second magnet, and fixes a second magnet seated in the second magnet accommodation portion.

Cut-out portions are formed at two opposite sides of the magnet fitting portion in a radial direction of the top mount.

A proximal part of the elastic transformation member has a shape having a hollow center based on a position from the portable device or the casing, wherein the coupling unit comprises: a lower mount configured to finish a hollow region of the proximal part of the elastic transformation member; a lower cap configured to fix a state in which a rim of the lower mount and a rim of the proximal part are tightly attached to each other; and a protective tape configured to cover the lower mount and a lower surface of the lower cap.

The proximal part comprises: a fixing blade portion formed along a circumference of the proximal part and disposed between the lower cap and the lower mount to fix the elastic transformation member to the coupling unit; and a plurality of coupling guide portions protruding in a radial direction from the fixing blade portion and positioned to be spaced apart from one another along a circumference of the fixing blade portion.

The lower mount comprises: a plurality of coupling mount portions, positioned to be spaced apart from one another along a circumference of the rim, and formed at a position corresponding to the coupling guide portion; and a tight fixing portion protruding between the coupling mount portions in the radial direction and configured to allow the fixing blade portion to be tightly attached and fixed to the lower surface of the lower cap.

The lower cap is formed in a disk shape having a hollow hole formed at a center thereof, wherein a rim of the proximal part is fitted and inserted into the hollow hole, wherein a first catching ring is formed on the lower surface of the lower cap, extends downward, and has an end bent inward, wherein an end of the tight fixing portion is bent upward, wherein a second catching ring is formed by bending the upward bent end outward again and engages with the first catching ring, and the rim of the proximal part is fixed by being tightly attached between the lower surface of the lower cap and an upper surface of the lower mount by the engagement between the first catching ring and the second catching ring.

A first magnet accommodation portion is formed at a center of the lower mount and communicates with an internal space of the elastic transformation member, and a first magnet inserted into the first magnet accommodation portion has a rim portion protruding between an upper end and a lower end along an outer peripheral surface in a circumferential direction.

The first magnet accommodation portion has a protrusion, the protrusion extends inward from an inner peripheral surface of an upper end of the first magnet accommodation portion to fix the first magnet, wherein the protrusion is provided as a plurality of protrusions positioned to be spaced apart from one another in a circumferential direction of the first magnet accommodation portion.

A magnet fitting portion is formed at a lower end of the first magnet accommodation portion, and the magnet fitting portion has an upward inclined surface provided at an end directed toward a center of the lower mount to guide insertion of the first magnet, and fixes the first magnet seated in the first magnet accommodation portion.

Cut-out portions are formed at two opposite sides of the magnet fitting portion in a radial direction of the lower mount.

Advantageous Effects

The effects of the present disclosure obtained by the above-described technical solution are as follows.

According to the present disclosure, the folding line is not processed, the side surfaces are formed as convex curved surfaces, the elastic transformation member is integrally formed by injection-molding, and/or a silicone material is provided, which may provide the user with a smoother gripping feeling in comparison with the related art.

In addition, the elastic transformation member, which is formed in the form of a sand glass as a whole, allows the distal and middle knuckles of the finger to be slightly spaced apart from the portable device or the casing, such that the elastic transformation member has the structure that allows the user to grasp the portable device or the casing in the shape in which the human finger curls or folds. Therefore, the accessory for a portable device having the above-mentioned structure provides the user with a more comfortable gripping feeling in comparison with the related art.

According to the structure proposed by the present disclosure in which the first cone-shaped part and the second cone-shaped part overlap and cover each other, it is possible to increase the extension length of the accessory for a portable device without excessively increasing the outer diameters of the cover unit and the distal part of the accessory for a portable device.

In addition, a deterioration in durability or tearing caused by repeated use begins to occur from the folding line. As proposed by the present disclosure, the folding line is not processed, such that it is possible to provide the accessory for a portable device that substantially does not deteriorate in durability or is not torn even though the accessory is used repeatedly.

DESCRIPTION OF DRAWINGS

FIG. 1 is a perspective view illustrating an accessory for a portable device proposed by the present disclosure when viewed from one side.

FIG. 2 is a perspective view illustrating the accessory for a portable device proposed by the present disclosure when viewed from the other side.

FIG. 3 is a side view of the accessory for a portable device proposed by the present disclosure.

FIG. 4 is a cross-sectional view illustrating a state in which the accessory for a portable device proposed by the present disclosure is in an extension mode.

FIG. 5 is an exploded perspective view illustrating the accessory for a portable device proposed by the present disclosure when viewed from one side.

FIG. 6 is an exploded perspective view illustrating the accessory for a portable device proposed by the present disclosure when viewed from the other side.

FIG. 7 is a cross-sectional view illustrating a state in which the accessory for a portable device proposed by the present disclosure is in a retraction mode.

FIG. 8 is a view illustrating a structure in which a cover unit of the accessory for a portable device proposed by the present disclosure is installed on a distal part of an elastic transformation member.

FIG. 9 is a view illustrating a structure in which a coupling unit of the accessory for a portable device proposed by the present disclosure is installed on a proximal part of the elastic transformation member.

FIG. 10 is an exploded perspective view illustrating the cover unit of the accessory for a portable device proposed by the present disclosure.

FIG. 11 is an exploded perspective view illustrating the coupling unit of the accessory for a portable device proposed by the present disclosure.

DETAILED DESCRIPTION OF EXEMPLARY EMBODIMENTS

Hereinafter, an accessory for a portable device related to the present disclosure will be described more specifically with reference to the drawings. In this case, the accessory for a portable device refers to a device configured to be used by being attached to a portable device or a casing configured to surround the portable device in order to provide convenience to a user.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present disclosure.

Singular expressions used in the present specification include plural expressions unless clearly described as different meanings in the context.

In the present specification, when one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

In addition, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

FIG. 1 is a perspective view illustrating an accessory for a portable device proposed by the present disclosure when viewed from one side.

FIG. 2 is a perspective view illustrating the accessory for a portable device proposed by the present disclosure when viewed from the other side.

FIG. 3 is a side view of the accessory for a portable device proposed by the present disclosure.

An accessory 100 for a portable device proposed by the present disclosure includes a coupling unit 110, an elastic transformation member 120, and a cover unit 130. In addition, the accessory 100 for a portable device includes a protective tape 114.

The coupling unit 110 is formed to be attachable to one surface of a portable device 10 or one surface of a casing (not illustrated) configured to surround the portable device. In this case, one surface of the portable device 10 or one surface of the casing mainly refers to a flat surface. For example, one surface of the portable device 10 or one surface of the casing may be a rear surface of the portable device 10 or a rear surface of the casing. However, the present disclosure is not necessarily limited thereto.

In the present disclosure, a mechanism by which the coupling unit 110 is attached to the portable device or the casing is not specifically limited. For example, the mechanism may be a magnetic force between a fixing magnet 115 and a magnet or a magnetic force between the magnet 115 and a metal. In addition, the mechanism may be an adhesive tape. In addition, various mechanisms may be applied.

The coupling unit 110 is coupled to the elastic transformation member 120 and restrains the elastic transformation member 120 so that the elastic transformation member 120 is not arbitrarily separated.

The coupling unit 110 may be configured as one component, i.e., a single component applied to the accessory 100 for a portable device or configured as an assembly including components such as a lower cap 111 and a lower mount 113 to be described below.

The elastic transformation member 120 is configured to be elastically transformed to extend and retract the accessory 100 for a portable device. An extension mode of the accessory 100 for a portable device is defined as a state in which the coupling unit 110 and the cover unit 130 are distant from each other by the elastic transformation of the elastic transformation member 120. Further, a retraction mode of the accessory 100 for a portable device is defined as a state in which the coupling unit 110 and the cover unit 130 are close to each other by the elastic transformation of the elastic transformation member 120.

The elastic transformation member 120 is disposed between the coupling unit 110 and the cover unit 130 to be described below and connected to the coupling unit 110 and the cover unit 130. The coupling unit 110 is disposed at a side close to the portable device 10 or the casing with the elastic transformation member 120 interposed therebetween, and the cover unit 130 is disposed at a side distant from the portable device 10 or the casing. When the user presses the cover unit 130, the elastic transformation member 120 is elastically transformed, and the accessory 100 for a portable device is transformed from the extension mode to the retraction mode.

Hereinafter, the structure of the accessory 100 for a portable device will be described in more detail with reference to a cross-sectional view and an exploded perspective view.

FIG. 4 is a cross-sectional view illustrating a state in which the accessory for a portable device proposed by the present disclosure is in an extended state.

FIG. 5 is an exploded perspective view illustrating the accessory for a portable device proposed by the present disclosure when viewed from one side.

FIG. 6 is an exploded perspective view illustrating the accessory for a portable device proposed by the present disclosure when viewed from the other side.

The coupling unit 110 may have a circular shape having a hollow portion 110a formed at a center thereof. The coupling unit 110 may have a shape that is comparatively flat and has a height. In case that the mechanism by which the coupling unit 110 is attached to the portable device or the casing is the magnetic force, the plurality of fixing magnets 115 may be arranged along a circumference of the lower cap 111 that defines an annular region between an outer rim of the coupling unit 110 and the hollow portion 110a.

The coupling unit 110 includes the lower cap 111, the lower mount 113, and the protective tape 114 that will be described below. In this case, the coupling unit 110 may be formed to surround the fixing magnet 115 in three directions by means of the lower cap 111. In this case, among the three directions, a first direction refers to a direction directed toward the portable device or the casing, a second direction refers to a direction directed outward from the hollow portion 110a of the coupling unit 110, and a third direction refers to a direction directed from the outside of the coupling unit 110 toward the hollow portion 110a at the inner side. The portions of the lower cap 111, which surround the fixing magnet 115 in the directions, are indicated by reference numerals 111a, 111b, and 111c in FIG. 4. The fixing magnet 115 may be press-fitted into an annular region RA defined by the portions 111a, 111b, and 111c surrounded in the three directions, as described above.

In this case, the directions are defined. The direction in which the coupling unit 110 and the cover unit 130 become close to or distant from each other corresponds to a direction (retraction direction) in which the accessory 100 for a portable device is retracted or a direction (extension direction) in which the accessory 100 for a portable device is extended. In FIG. 4, the retraction direction of the accessory 100 for a portable device is indicated by D1, and the extension direction is indicated by D2.

The names of the retraction direction D1 and the extension direction D2 are arbitrary. The retraction direction D1 may correspond to a direction in which the coupling unit 110 is attached to the portable device and also be referred to as a first direction. In addition, the extension direction D2 may correspond to a direction in which the coupling unit 110 is separated from the portable device and also be referred to as a second direction. Like the relationship between the retraction direction D1 and the extension direction D2, the first direction and the second direction are opposite directions.

Based on a position from the attachment target portable device or the attachment target casing to which the coupling unit 110 is attached, a proximal part 124 of the elastic transformation member 120 is coupled to the coupling unit 110, and a distal part 125 of the elastic transformation member 120 is coupled to the cover unit 130.

A first cone-shaped part 121 and a second cone-shaped part 122 may be formed between the distal part 125 and the proximal part 124, and a connecting part 123 may be formed between the first cone-shaped part 121 and the second cone-shaped part 122. Hereinafter, the parts will be described.

The cone shape, which defines the shape of the first cone-shaped part 121 and the shape of the second cone-shaped part 122, refers to a three-dimensional shape in which an outer diameter of any one end portion is relatively small, an outer diameter of the other end portion is relatively large, and side surfaces 121a and 122a between one side and the other side are formed as convex curved surfaces. The above-mentioned cone shape may be referred to as another name. For example, the side surfaces 121a and 122a may be named round conical shapes, the side surface may be named a round truncated conical shape, or the side surface may be named a round bell shape.

The first cone-shaped part 121 is disposed to be close to the coupling unit 110, and the second cone-shaped part 122 is disposed to be close to the cover unit 130. The side surfaces 121a and 122a are formed as convex curved surfaces in common. However, the first cone-shaped part 121 and the second cone-shaped part 122 may be different in sizes and detailed shapes from each other. For example, as illustrated in the drawings, the second cone-shaped part 122 may have a larger outer diameter than the first cone-shaped part 121. When the accessory 100 for a portable device switches to a retracted state, the second cone-shaped part 122 may cover the first cone-shaped part 121 because of the difference in outer diameters.

It has been described above that the cone shape may also be named the bell shape. In the designations of the portions of the bell shape, a head refers to an apex, which has a small outer diameter, or a region around the apex, and a lip refers to a periphery of an opening opposite to the head. The terms 'head' and 'lip' may also be applied to the cone shape in a similar way. For example, the outer diameter of the cone shape gradually increases or decreases toward one side as a whole. The apices, which have a small outer diameter, or the regions around the apices of the cone shapes correspond to heads 121b and 122b of the first cone-shaped part 121 and the second cone-shaped part 122, and the regions, which have a larger outer diameter than the heads and are disposed to be opposite to the heads 121b and 122b, correspond to lips 121c and 122c.

The first cone-shaped part 121 and the second cone-shaped part 122 are directed in opposite directions. Specifically, the head 121b of the first cone-shaped part 121 and the head 122b of the second cone-shaped part 122 are directed toward each other. Further, the portions opposite to the two heads 121b and 122b, i.e., the two lips 121c and 122c are directed in opposite directions.

The head 121b of the first cone-shaped part 121 and the head 122b of the second cone-shaped part 122 may be connected to each other directly or indirectly. This means that there may or may not be another component disposed between the first cone-shaped part 121 and the second cone-shaped part 122 and configured to connect the first cone-shaped part 121 and the second cone-shaped part 122. In case that the first cone-shaped part 121 and the second cone-shaped part 122 are connected to each other indirectly, the connecting part 123 is provided between the first cone-shaped part 121 and the second cone-shaped part 122.

The connecting part 123 is positioned between the first cone-shaped part 121 and the second cone-shaped part 122 and connects the head 121b of the first cone-shaped part 121b and the head 122b of the second cone-shaped part 122. The connecting part 123 extends in the direction D1 in which the coupling unit 110 and the cover unit 130 become close to each other or the direction D2 in which the coupling unit 110 and the cover unit 130 become distant from each other, and the connecting part 123 is connected to the first cone-shaped part 121 and the second cone-shaped part 122.

Meanwhile, the connecting part 123 may be formed to have an outer diameter that gradually increases toward two opposite ends thereof. In this case, the two opposite ends refer to two opposite ends of the accessory 100 for a portable device in the retraction direction D1 or the extension direction D2. Therefore, the outer diameter is smallest at the center of the connecting part 123, and the outer diameter gradually increases toward the two opposite ends. FIG. 4 also illustrates a fine change in outer diameter.

A thickness of a cross-section of the connecting part 123 is larger than a thickness of a cross-section of the first cone-shaped part 121 or a thickness of a cross-section of the second cone-shaped part 122, such that the connecting part 123 presses and elastically transforms the first cone-shaped part 121 and the second cone-shaped part 122 when the mode changes from the extension mode to the retraction mode.

That is, the thickness of the cross-section of the connecting part 123 is larger than the thickness of the cross-section of the first cone-shaped part 121 or the thickness of the cross-section of the second cone-shaped part 122, such that a relatively higher transformation force is generated. Therefore, the connecting part 123 may induce a smooth elastic transformation by pressing the first cone-shaped part 121 and the second cone-shaped part 122 having relatively low transformation forces when the elastic transformation member 120 switches from the extension mode to the retraction mode.

The first cone-shaped part 121 and the second cone-shaped part 122 have a sand glass or hourglass shape as a whole between the first cone-shaped part 121 and the second cone-shaped part 122 by a connection relationship between the first cone-shaped part 121 and the second cone-shaped part 122. However, two opposite sides of the sand glass are not necessarily symmetric.

The elastic transformation member 120, which is formed in the form of a sand glass as a whole, allows the distal and middle knuckles of the finger to be slightly spaced apart from the portable device or the casing, such that the elastic transformation member 120 has the structure that allows the user to grasp the portable device or the casing in the shape in which the human finger curls or folds. Therefore, the accessory 100 for a portable device having the above-mentioned structure provides the user with a more comfortable gripping feeling in comparison with the related art.

Meanwhile, a first region S1 and a second region S2, which are empty spaces, are formed in the first cone-shaped part 121 and the second cone-shaped part 122. In this case, the first region S1 refers to a space defined by the first cone-shaped part 121 and the coupling unit 110. Further, the second region S2 refers to a space defined by the second cone-shaped part 122 and the cover unit 130. A third region S3 is defined as an internal region in the connecting part 123.

Air existing in the inside needs to be discharged so that the accessory 100 for a portable device switches from the extended state to the retracted state. To this end, the first cone-shaped part 121 and the second cone-shaped part 122 each have at least one hole 121d and 122d. The holes 121d and 122d may be formed in the side surfaces 121a and 122a of the first cone-shaped part 121 and the second cone-shaped part 122 or formed around the heads 121b and 122b. For example, with reference to the drawings, the hole 121d of the first cone-shaped part 121 is formed around the head 121b, and the hole 122d of the second cone-shaped part 122 is formed in a convexly inclined side surface 122a.

A folding line for elastic transformation of the elastic transformation member 120 is not processed on the first cone-shaped part 121 and the second cone-shaped part 122, and the first cone-shaped part 121 and the second cone-shaped part 122 respectively have the side surfaces 121a and 122a formed as convex curved surfaces. In addition, the elastic transformation member 120 including the first cone-shaped part 121, the second cone-shaped part 122, the connecting part 123, the proximal part 124, and the distal part 125 is formed integrally by injection-molding, and a material of the elastic transformation member 120 may be a silicone material. Therefore, an elastic restoring force of the elastic transformation member 120 may provide a shape feature and a material feature.

If the folding line is processed, a stepped portion is present, which provides the user with a rough, inconvenient gripping feeling. However, according to the present disclosure, the folding line is not processed, the side surfaces 121a and 122a are formed as convex curved surfaces, the elastic transformation member 120 is integrally formed by injection-molding, and/or a silicone material is provided, which may provide the user with a smoother gripping feeling in comparison with the related art.

In addition, a deterioration in durability or tearing caused by repeated use begins to occur from the folding line. As proposed by the present disclosure, the folding line is not processed, such that it is possible to provide the accessory for a portable device that substantially does not deteriorate in durability or is not torn even though the accessory is used repeatedly.

In some embodiments of the present disclosure, in order to prevent an excessive increase in size of the accessory 100 for a portable device, the side surface 121a of the first cone-shaped part 121 and the side surface 122a of the second cone-shaped part 122 may not have an inflection point on a gradient of a tangent line. On the contrary, if the side surface 121a of the first cone-shaped part 121 and the side surface 122a of the second cone-shaped part 122 have inflection points on gradients of tangent lines, the proximal part 124 formed on the lip 121c of the first cone-shaped part 121 and the distal part 125 formed on the lip 122c of the second cone-shaped part 122 inevitably increase in outer diameters unnecessarily, which increases a size of the cover unit 130. A configuration in which the size of the accessory

100 for a portable device is excessively large is not preferable because the configuration causes discomfort to the user.

Meanwhile, in the retraction mode, interference prevention slit grooves 121e and 122e may be respectively formed in an inner peripheral surface of the first cone-shaped part 121 and an inner peripheral surface of the second cone-shaped part 122 to prevent interference with at least one of the coupling unit 110 and the cover unit 130. In the retraction mode of the accessory 100 for a portable device, the interference prevention slit grooves 121e and 122e may minimize interference and frequent friction with the coupling unit 110 and the cover unit 130, thereby improving the durability of the components and implementing the stable retraction mode.

In the region in which the slit grooves 121e and 122e are formed, the thickness of the cross-section of the first cone-shaped part 121 and the thickness of the cross-section of the second cone-shaped part 122 is smaller than that of the peripheral region thereof. Therefore, in the retraction mode of the elastic transformation member 120, the interference and spatial density between the coupling unit 110 and the cover unit 130 may be minimized by the transformation of the first cone-shaped part 121 and the second cone-shaped part 122.

In addition, the slit grooves 121e and 122e are formed in closed-curve shapes in the inner peripheral surface of the first cone-shaped part 121 and the inner peripheral surface of the second cone-shaped part 122. That is, when the elastic transformation member 120 is viewed in an upward/downward direction, the slit grooves 121e and 122e are formed in closed-curve shapes in the inner peripheral surface of the first cone-shaped part 121 and the inner peripheral surface of the second cone-shaped part 122, such that in the retraction mode of the elastic transformation member 120, a transformation force is uniformly received, the retraction mode is more smoothly implemented, and the slit grooves 121e and 122e are easily formed in the inner peripheral surface of the first cone-shaped part 121 and the inner peripheral surface of the second cone-shaped part 122.

In addition, in the extension mode, the slit groove 122e is spaced apart from the cover unit 130. When the accessory is elastically transformed to the retraction mode, the slit groove 122e is formed in a region in which the slit groove 122e moves to a position facing the cover unit 130.

The proximal part 124 of the elastic transformation member 120 is coupled to the lower mount 113 of the coupling unit 110. The proximal part 124 partially surrounds the lower mount 113 in a radial direction of the accessory 100 for a portable device, and the lower cap 111 of the coupling unit 110 surrounds the proximal part 124 again. The lower cap 111, the proximal part 124, and the lower mount 113 may be positioned on concentric circles.

FIG. 9 is a view illustrating a structure in which the coupling unit of the accessory for a portable device proposed by the present disclosure is installed on the proximal part of the elastic transformation member.

FIG. 11 is an exploded perspective view illustrating the coupling unit of the accessory for a portable device proposed by the present disclosure.

With reference to FIGS. 9 and 11, the lower mount 113 will be described first in order to describe the coupling relationship between the lower cap 111, the proximal part 124, and the lower mount 113. The lower mount 113 refers to a member that blocks one side opening of the elastic transformation member 120. In this case, one side opening refers to an opening O1 surrounded by the lip 121c of the first cone-shaped part 121 or the proximal part 124. The proximal part 124 corresponds to a shape with a hollow center, i.e., a shape having the opening O1 in which the lower mount 113 is disposed.

The coupling unit 110 may include the lower cap 111, the lower mount 113, and the protective tape 114.

The lower cap 111 serves to fix the lower mount 113 and the proximal part 124 in a state in which a rim of the lower mount 113 and a rim of the proximal part 124 are tightly attached to each other. The lower cap 111 is formed in a flat disk shape having a hollow hole 111h formed at a center thereof, and the rim of the proximal part 124 is fitted and inserted into the hollow hole 111h. In addition, as described above, at the rim of the lower cap 111, the fixing magnet 115 is installed by being press-fitted into the annular region RA defined by the portions 111a, 111b, and 111c surrounded in the three directions. In this case, the hollow hole 111h may be substantially considered as a component such as the hollow portion 110a of the coupling unit 110.

The lower cap 111 has an outer diameter larger than an outer diameter of the lower mount 113 and covers an entire upper surface of the lower mount 113. In a state in which the lower cap 111 and the lower mount 113 are assembled, a lower surface of the coupling unit 110 is entirely finished by the protective tape 114, such that a sealed state in which the lower mount 113 is not exposed to the outside of the accessory 100 for a portable device is implemented.

The lower mount 113 serves to finish the opening O1, i.e., the hollow region of the proximal part 124 of the elastic transformation member 120 having the rim fitted and inserted into the hollow hole 111h. In addition, a first magnet accommodation portion 113c to be described below is formed at a center of the lower mount 113, and a first magnet 112 is installed in the first magnet accommodation portion 113c. The first magnet 112, together with a second magnet 132 to be described below, serves to implement the retraction mode or the extension mode of the accessory 100 for a portable device.

The protective tape 114 may be formed to have a size and a shape substantially identical or equivalent to the outer diameter of the coupling unit 110 in order to protect the coupling unit 110 and prevent the lower mount 113 and the fixing magnet 115 from being separated from the lower cap 111. Among the lower mount 113, the proximal part 124, and the lower cap 111, the lower cap 111 has the largest outer diameter. Therefore, when the protective tape 114 has the size and the shape described above, the protective tape 114 may protect both one part of the lower mount 113 and one part of the lower cap 111.

The rim of the proximal part 124 includes fixing blade portions 124a and coupling guide portions 124b.

The fixing blade portion 124a is disposed between the lower cap 111 and the lower mount 113 and allows the elastic transformation member 120 to be stably fixed to the coupling unit 110. The fixing blade portions 124a are tightly attached to the lower surface of the lower cap 111 by means of tight fixing portions 113b of the lower mount 113 to be described below, thereby providing a stable fixed state of the elastic transformation member 120 with respect to the coupling unit 110.

The coupling guide portions 124b are provided as a plurality of coupling guide portions 124b formed on the outer periphery of the rim. The plurality of coupling guide portions 124b are positioned to be spaced apart from one another along the circumference of the rim and protrude in the radial direction. The coupling guide portions 124b are tightly attached to coupling mount portions 113a of the lower mount 113 to be described below when the elastic transformation member 120 and the lower mount 113 are coupled. The coupling guide portions 124b serve to facilitate the assembling process between the elastic transformation member 120 and the lower mount 113 and provide a stably/tightly fixed state in a coupled state of the elastic transformation member 120 and the lower mount 113.

The lower mount 113 includes the coupling mount portions 113a and the tight fixing portions 113b.

The coupling mount portions 113a are provided as a plurality of coupling mount portions 113a positioned to be spaced apart from one another along the circumference of the lower mount 113. The coupling mount portions 113a are portions that define types of stepped grooves between the tight fixing portions 113b protruding from an outer periphery of the lower mount 113. The coupling mount portions 113a accommodate the coupling guide portions 124b of the proximal part 124, thereby facilitating the assembling process between the elastic transformation member 120 and the lower mount 113 when the elastic transformation member 120 and the lower mount 113 are coupled, and providing the stably/tightly fixed state in the coupled state of the elastic transformation member 120 and the lower mount 113.

The tight fixing portions 113b protrude between the coupling mount portion 113a in the radial direction and allow the fixing blade portions 124a of the proximal part 124 to be tightly attached and fixed to the lower surface of the lower cap 111. That is, the tight fixing portion 113b may be configured to provide the highest fixing force of the lower mount 113 to the rim of the proximal part 124 in order to implement the coupled state of the elastic transformation member 120 and the coupling unit 110.

For example, the stably coupled state of the elastic transformation member 120 with respect to the coupling unit 110 implemented by the lower cap 111 and the lower mount 113 may be implemented by a coupling configuration such as a protrusion/groove, an adhesive tape, and a catching ring.

Specifically, the coupled state of the elastic transformation member 120 with respect to the coupling unit 110 implemented by the lower cap 111 and the lower mount 113 may be achieved by catching ring components of the lower cap 111 and the lower mount 113.

That is, the lower cap 111 may have first catching rings 111d formed on a lower surface around the hollow hole 111h at the center, extending downward, and having ends bent inward. Second catching rings 113ba are formed at ends of the tight fixing portions 113b of the lower mount 113, bent upward, and having a structure in which the ends bent upward are bent outward again, such that the second catching rings 113ba engage with the first catching rings 111d.

Therefore, with the engagement between the first catching rings 111d and the second catching rings 113ba, the rim of the proximal part 124 may be stably fixed by being tightly attached to a portion between the lower surface of the lower cap 111 and the upper surface of the lower mount 113.

Meanwhile, the lower mount 113 may include the first magnet accommodation portion and the first magnet that assist in implementing the retraction mode of the elastic transformation member 120.

Specifically, the first magnet accommodation portion 113c is formed at a center of the lower mount 113 and communicates with an internal space of the elastic transformation member 120. In addition, the first magnet 112 is provided in the first magnet accommodation portion 113c and has a rim portion 112a protruding in a circumferential direction along an outer peripheral surface.

In this case, the first magnet 112, together with the second magnet 132 in a second magnet accommodation portion 133$c$ formed in a top mount 133 of the cover unit 130 to be described below, serves to allow the first cone-shaped part 121 and the second cone-shaped part 122 to be more smoothly retracted and transformed in the retraction mode of the elastic transformation member 120.

The first magnet accommodation portion 113$c$ may have a flat cylindrical shape penetrating a center of the lower mount 113, and protrusions 113$d$ for fixing the first magnet 112 may be provided on an inner peripheral surface of an upper end of the cylindrical shape.

In order to fix the first magnet 112, the protrusions 113$d$ may extend inward from an inner peripheral surface of an upper end of the first magnet accommodation portion 113$c$. In addition, the protrusions 113$d$ are provided as a plurality of protrusions 113$d$ positioned to be spaced apart from one another in a circumferential direction of the first magnet accommodation portion 113$c$. Therefore, the protrusion 113$d$ may achieve a stably fixed state of the first magnet 112 with respect to the first magnet accommodation portion 113$c$.

In this case, the rim portion 112$a$ of the first magnet 112 is fixed by being tightly attached to the protrusion 113$d$, and an upper surface of the first magnet 112 is exposed to the first region S1 defined by the first cone-shaped part 121 of the elastic transformation member 120.

In addition, magnet fitting portions 113$e$ are formed at a lower end of the first magnet accommodation portion 113$c$ to guide the insertion of the first magnet 112 and fix the first magnet 112 in a state of being seated in the first magnet accommodation portion 113$c$. Therefore, with the magnet fitting portions 113$e$, the first magnet 112 may be conveniently installed and inserted into the first magnet accommodation portion 113$c$ from below the lower mount 113.

The structure or shape of the magnet fitting portion 113$e$ is not specifically limited as long as the structure may conveniently insert and install the first magnet 112 into the first magnet accommodation portion 113$c$. For example, in order to guide the insertion of the first magnet 112, an upward inclined surface may be provided at an end of the magnet fitting portion 113$e$ directed toward the center of the lower mount 113, and the magnet fitting portion 113$e$ may be configured to fix the first magnet 112 in the state of being seated in the first magnet accommodation portion 113$c$. In addition, cut-out portions 113$e$ a may be formed at two opposite sides of the magnet fitting portion 113$e$ in the radial direction of the lower mount 113.

Therefore, the magnet fitting portion 113$e$ may be structured to be more easily transformed elastically by the cut-out portions 113$ea$ when the first magnet 112 is inserted, such that the first magnet 112 may be more easily inserted. In addition, the magnet fitting portion 113$e$ may simultaneously implement a seated state and a fixed state with respect to the magnet fitting portion 113$e$ by softly pushing the first magnet 112 by means of the inclined surface when the first magnet 112 is inserted, such that the first magnet 112 is more conveniently mounted.

Next, the cover unit 130 will be described.

The cover unit 130 may be configured as one component, i.e., a single component applied to the accessory 100 for a portable device or configured as an assembly including components such as the top mount 133 and a cover cap 131 to be described below.

FIG. 8 is a view illustrating a structure in which the cover unit of the accessory for a portable device proposed by the present disclosure is installed on the distal part of the elastic transformation member.

FIG. 10 is an exploded perspective view illustrating the cover unit of the accessory for a portable device proposed by the present disclosure.

With reference to FIGS. 8 and 10, the cover unit 130 blocks an opening O2 formed in the distal part 125 of the elastic transformation member 120. The cover unit 130 is connected to the elastic transformation member 120 and becomes distant from the coupling unit 110 or close to the coupling unit 110 in accordance with the elastic transformation of the elastic transformation member 120.

In addition, based on the position from the portable device or the casing, the distal part 125 of the elastic transformation member 120 has a shape having a hollow center so that the cover unit 130 is disposed, and a rim groove 125$c$ for accommodating a rim of the cover unit 130 is formed along a rim of the distal part 125. The rim groove 125$c$ of the distal part 125 serves to provide a stably seated state of the cover unit 130 when the cover unit 130 is assembled to the distal part 125.

The cover unit 130 includes the cover cap 131, the top mount 133, and a cover film 134.

The cover cap 131 is formed in a flat disk shape as a whole and has a larger outer diameter than the distal part 125, such that the cover cap 131 is disposed to cover both the cover film 134 and the distal part 125. An outer peripheral cover portion 131$a$ and cap fixing protruding portions 131$b$ are formed on a lower surface of the rim of the cover cap 131.

A lower surface of the outer peripheral cover portion 131$a$ is formed as an inclined surface 131$aa$ lowered in the radial direction to cover the entire upper end of the distal part 125, and the outer peripheral cover portion 131$a$ is formed to have a larger thickness than another portion 131$c$ of the cover cap 131. A material, which constitutes the outer peripheral cover portion 131$a$, is not specifically limited. For example, the material of the outer peripheral cover portion 131$a$ may be a plastic material having higher rigidity than a material that constitutes the elastic transformation member 120.

The outer peripheral cover portion 131$a$ is a portion that comes into direct contact with a floor surface when the portable device 10 is inclined and mounted on the floor surface by transforming the elastic transformation member 120 to the extension mode in case that the accessory 100 for a portable device is coupled to the portable device 10 and used. Therefore, the outer peripheral cover portion 131$a$ may be made of a material, such as acrylate resin, ABS resin, or EVA resin, comparatively excellent in rigidity and durability, such that friction between the accessory 100 for a portable device and the floor surface may be minimized, and the extension mode state of the elastic transformation member 120 may be more stably maintained. In addition, the outer peripheral cover portion 131$a$ may reduce deformation, abrasion, and the like of the cover unit 130.

The cap fixing protruding portion 131$b$ is structured to extend in the downward direction and formed the inside adjacent to the inclined portion 131$aa$ of the lower surface of the outer peripheral cover portion 131$a$. The cap fixing protruding portions 131$b$ are inserted into cover cap fixing grooves 125$a$ formed in an upper surface of the distal part 125 so that the cover cap 131 is stably seated on an upper portion of the distal part 125.

In addition, the cap fixing protruding portions 131$b$ are provided as a plurality of cap fixing protruding portions 131$b$. The plurality of cap fixing protruding portions 131$b$ are formed as at least two cap fixing protruding portions positioned to be spaced apart from each other along the circumference of the cover cap 131. The cover cap fixing grooves 125a are formed at positions corresponding to the positions at which the cap fixing protruding portions 131b are formed along the circumference of the distal part 125. Therefore, a weight of the cover cap 131 may be minimized, and the cover cap 131 and the distal part 125 may be more conveniently coupled.

The top mount 133 is exposed through the hollow region of the distal part 125 of the elastic transformation member 120. The top mount 133 and the distal part 125 may be coupled to each other by an insertion portion 133b of the top mount 133 and a top mount fixing groove 125b of the distal part 125. In this case, the insertion portion 133b may be formed as the insertion portion 133b having the structure in which an end of a stepped portion 133a of the rim of the top mount 133 bent downward is bent again in the radial direction.

Meanwhile, the top mount 133 may include the second magnet accommodation portion 133c and the second magnet 132 that assist in implementing the retraction mode of the elastic transformation member 120.

Specifically, the second magnet accommodation portion 133c is formed at the center of the top mount 133 and communicates with the internal space of the elastic transformation member 120. The second magnet 132 inserted into the second magnet accommodation portion 133c has a rim portion 132a protruding between an upper end and a lower end along an outer peripheral surface in the circumferential direction.

In this case, the second magnet 132 serves to allow the first cone-shaped part 121 and the second cone-shaped part 122 to be more smoothly retracted and transformed in the retraction mode of the elastic transformation member 120 by means of an attractive force applied with the first magnet 112 in the first magnet accommodation portion 113c formed in the lower mount 113 of the coupling unit 110.

The second magnet accommodation portion 133c may have a flat cylindrical shape penetrating a center of the top mount 133, and protrusions 133d extending inward to fix the second magnet 132 may be provided on an inner peripheral surface of a lower end of the cylindrical shape. In order to fix the second magnet 132, the protrusions 133d may extend inward from an inner peripheral surface of a lower end of the second magnet accommodation portion 133c. The protrusions 133d are provided as a plurality of protrusions 133d positioned to be spaced apart from one another in the circumferential direction of the second magnet accommodation portion 133c.

In this case, the rim portion 132a of the second magnet 132 is fixed by being tightly attached to the protrusion 133d, and a lower surface of the second magnet 132 is exposed to the second region S2 defined by the second cone-shaped part 122 of the elastic transformation member 120.

In addition, a magnet fitting portion 133e is formed at an upper end of the second magnet accommodation portion 133c. In order to guide the insertion of the second magnet 132, a downward inclined surface is provided at an end of the magnet fitting portion 133e directed toward the center of the top mount 133, and the second magnet 132 in the state of being seated in the second magnet accommodation portion 133c is fixed. Therefore, with the magnet fitting portion 133e, the second magnet 132 may be conveniently installed and inserted into the second magnet accommodation portion 133c from above the top mount 133.

The structure or shape of the magnet fitting portion 133e is not specifically limited as long as the structure may conveniently insert and install the second magnet 132 into the second magnet accommodation portion 133c. For example, in order to guide the insertion of the second magnet 132, a downward inclined surface may be provided at an end of the magnet fitting portion 133e directed toward the center of the top mount 133, and the magnet fitting portion 133e may be configured to fix the second magnet 132 in the state of being seated in the second magnet accommodation portion 133c.

In addition, the magnet fitting portion 133e may have a cut-out portion 133ea extending in the radial direction of the top mount 133. Therefore, the magnet fitting portion 133e may be structured to be more easily transformed elastically by the cut-out portion 133ea when the second magnet 132 is inserted, such that the second magnet 132 may be more easily inserted. In addition, the magnet fitting portion 133e may simultaneously implement a seated state and a fixed state with respect to the magnet fitting portion 133e by softly pushing the second magnet 132 by means of the downward inclined surface when the second magnet 132 is inserted, such that the second magnet 132 is more conveniently mounted.

Hereinafter, the transformation of the accessory for a portable device from the extended state to the retracted state will be described with reference to FIGS. 4 and 7.

FIG. 4 is a cross-sectional view illustrating a state in which the accessory for a portable device proposed by the present disclosure is in the extended state. FIG. 7 is a cross-sectional view illustrating a state in which the accessory for a portable device proposed by the present disclosure is in the retracted state.

The accessory 100 for a portable device may be transformed from the extension mode to the retraction mode when the cover unit 130 is pressed toward the portable device in the state in which the accessory 100 for a portable device is attached to the portable device or the casing. Alternatively, the accessory 100 for a portable device may be transformed from the extension mode to the retraction mode when the cover unit 130 and the coupling unit 110 are pressed so that the cover unit 130 and the coupling unit 110 become close to each other.

During the process in which the accessory 100 for a portable device is transformed from the extension mode to the retraction mode by being pressed, the connecting part 123 presses at least one of the head 121b of the first cone-shaped part 121 and the head 122b of the second cone-shaped part 122, such that the first cone-shaped part 121 and/or the second cone-shaped part 122 is elastically transformed.

The shape of the elastic transformation member 120 is transformed during the process in which the accessory 100 for a portable device is transformed. In particular, the head 121b of the first cone-shaped part 121 and the head 122b of the second cone-shaped part 122 are pressed by the connecting part 123, such that the side surface 121a or 122a of at least one of the first cone-shaped part 121 and the second cone-shaped part 122 is elastically transformed curvedly.

In this case, the thickness of the cross-section of the connecting part 123 is larger than the thickness of the cross-section of each of the first cone-shaped part 121 and the second cone-shaped part 122, such that the first cone-shaped part 121 and the second cone-shaped part 122 are pressed and elastically transformed to the retraction mode in which a distance between the coupling unit 110 and the cover unit 130 decreases.

That is, with the configuration in which the thickness of the cross-section of the connecting part 123 is larger than the thickness of the cross-section of each of the first cone-shaped part 121 and the second cone-shaped part 122, the elastic transformation member 120 allows the first cone-shaped part 121 and the second cone-shaped part 122 to be in a pressed state when the elastic transformation member 120 is transformed to the retraction mode, such that the first cone-shaped part 121 and the second cone-shaped part 122 may be stably and elastically transformed, and the retraction mode state may be easily implemented.

Specifically, in the extension mode of the accessory 100 for a portable device, the side surface 121a of the first cone-shaped part 121 and the side surface 122a of the second cone-shaped part 122 do not have inflection points on the gradients of the tangent lines. However, in the retraction mode, at least one of the two side surfaces 121a and 122a is elastically transformed to have an inflection point 121f or 122f.

With reference to the drawings, by an application of an external force, i.e., the user's force and an attractive force between the first magnet 112 and the second magnet 132, the head 121b of the first cone-shaped part 121 is positioned to be close to the coupling unit 110, and the side surface 121a of the first cone-shaped part 121 becomes distant from the coupling unit 110 in the radial direction and then becomes close to the coupling unit 110 as the inflection point 121f occurs. In addition, the head 122b of the second cone-shaped part 122 becomes close to the coupling unit 110 in the radial direction and then becomes distant from the coupling unit 110 as the inflection point 122f occurs.

The inflection points 121f and 122f of the first cone-shaped part 121 and the second cone-shaped part 122 may be considered as points at which signs of curvatures are changed from this point of view of a curvature of a curved line. For example, in the orthogonal coordinate plane, the first cone-shaped part 121 has a parabolic shape (convex upward) of a quadratic function with a negative integer as a coefficient of the second term as a whole in the extension mode. In the retraction mode, the cross-sections of the two opposite sides of the first cone-shaped part each have a parabolic shape (convex downward) of a quadratic function with a positive integer of the second term. That is, the sign of the curvature is changed to the opposite sign when the first cone-shaped part 121 is transformed from the extension mode to the retraction mode. The point at which the sign of the curvature is changed as described above may be defined as the inflection point 121f. The configuration of the inflection point 121f at which the sign of the curvature of the first cone-shaped part 121 is changed is also applied to the inflection point 122f of the second cone-shaped part 122 in the same way.

Meanwhile, in the retraction mode, based on the radial direction of the elastic transformation member 120, the connecting part 123 overlaps the inflection point 121f formed on the side surface of the first cone-shaped part 121 at a relatively close position, and the connecting part 123 overlaps the inflection point 122f formed on the side surface of the second cone-shaped part 122 at a relatively distant position.

The configuration in which the connecting part overlaps the inflection point 121f of the first cone-shaped part 121 and the inflection point 122f of the second cone-shaped part 122 in the retraction mode maximizes the spatial utilization of the components in the retraction mode of the accessory 100 for a portable device, such that the accessory 100 for a portable device having the compact structure may be implemented.

In addition, the retraction mode of the accessory 100 for a portable device is maintained so that the attractive force is applied in the state in which the first magnet 112 and the second magnet 132 are spaced apart from each other at a predetermined interval. That is, the first magnet 112 and the second magnet 132 are kept in the state in which the first magnet 112 and the second magnet 132 are spaced apart from each other at a predetermined interval while an attractive force is applied therebetween without being kept in the state in which the first magnet 112 and the second magnet 132 are completely in contact with each other by an attractive force, such that noise and excessively great deformation caused by the contact between the first magnet 112 and the second magnet 132 are suppressed, thereby further improving convenience and smooth gripping feeling of the user of the accessory 100 for a portable device.

In this case, the state in which the first magnet 112 and the second magnet 132 are spaced apart from each other at a predetermined interval may be implemented by a length of the connecting part 123 and also be implemented by adjusting a length of the first magnet accommodation portion 113c or the second magnet accommodation portion 133c in the upward/downward direction.

The elastically transformed second cone-shaped part 122 is configured to cover the connecting part 123 and the first cone-shaped part 121. Any one of the first cone-shaped part 121 and the second cone-shaped part 122 may be formed to have a larger rim than the other of the first cone-shaped part 121 and the second cone-shaped part 122. The drawings illustrate that the second cone-shaped part 122 is formed to have a larger rim than the first cone-shaped part 121. When the rim of the second cone-shaped part 122 is larger than the rim of the first cone-shaped part 121, the rim of the distal part 125 is also formed to be larger than the rim of the proximal part 124.

As the side surface 121a of the first cone-shaped part 121 and the side surface 122a of the second cone-shaped part 122 are elastically transformed as described above, based on the radial direction of the elastic transformation member 120 in the retraction mode of the accessory 100 for a portable device, the side surface 121a of the first cone-shaped part 121 and the side surface 122a of the second cone-shaped part 122 may overlap each other, the side surface 121a of the first cone-shaped part 121 and the connecting part 123 may overlap each other, or the side surface 122a of the second cone-shaped part 122 and the connecting part 123 may overlap each other. With the above-mentioned overlap, the accessory 100 for a portable device may change to the retraction mode.

In the related art having a shape tapered only in one direction, the outer diameter of the distal end inevitably needs to be increased to increase the extension length. However, according to the structure proposed by the present disclosure in which the first cone-shaped part 121 and the second cone-shaped part 122 overlap and cover each other, it is possible to increase the extension length of the accessory 100 for a portable device without excessively increasing the outer diameters of the cover unit 130 and the distal part 125 of the accessory 100 for a portable device.

The foregoing is merely exemplary, and various modifications may be made by those skilled in the art to which the present disclosure pertains, without departing from the scope and technical spirit of the described embodiments. The above-mentioned embodiments may be implemented individually or in any combination.

100: Accessory for portable device
110: Coupling unit
111: Lower cap
112: First magnet
113: Lower mount 114: Protective tape
115: Fixing magnet
120: Elastic transformation member
121: First cone-shaped part
122: Second cone-shaped part
130: Cover unit
131: Cover cap
132: Second magnet
133: Top mount
134: Cover film

INDUSTRIAL APPLICABILITY

The present disclosure may be applied to the accessory for a portable device, which is used by being attached to the portable device or the casing that surrounds the portable device, and provide the user with a smooth gripping feeling and convenience.

The invention claimed is:

1. An accessory for a portable device, the accessory comprising:

a coupling unit configured to be attachable to one surface of a portable device or one surface of a casing that surrounds the portable device;

an elastic transformation member connected to the coupling unit; and a cover unit connected to the elastic transformation member and configured such that a distance between the cover unit and the coupling unit is increased or decreased in accordance with elastic transformation of the elastic transformation member, wherein the elastic transformation member comprises:

a first cone-shaped part disposed close to the coupling unit and having a side surface formed as a convex curved surface;

a second cone-shaped part disposed close to the cover unit and having a side surface formed as a convex curved surface; and a connecting part configured to connect the first cone-shaped part and the second cone-shaped part, wherein a smaller outer diameter portion of the first cone-shaped part and the second cone-shaped part are directed toward each other and a larger outer diameter portion of the first cone-shaped part and the second cone-shaped part directed in opposite directions, wherein an outer diameter of either the first cone-shaped part or the second cone-shaped part is larger than an outer diameter of the other, wherein a state in which the coupling unit and the cover unit become close to each other by the elastic transformation of the elastic transformation member is defined as a retraction mode, wherein a state in which the coupling unit and the cover unit become distant from each other by the elastic transformation of the elastic transformation member is defined as an extension mode, wherein the side surface of at least one of the first cone-shaped part and the second cone-shaped part is elastically transformed curvedly when the elastic transformation member is transformed from the extension mode to the retraction mode, wherein an inflection point at which a sign of a curvature is changed occurs on the side surface of the first cone-shaped part and the side surface of the second cone-shaped part when the elastic transformation member is transformed from the extension mode to the retraction mode, wherein one of the first cone-shaped part and the second cone-shaped part covers the other when the elastic transformation member is transformed to the retraction mode from the extension mode, and wherein the inflection point formed on the side surface of one of the first cone-shaped part and the second cone shaped part is disposed closer to the connecting part than the inflection point formed on the side surface of the other one of the first cone-shaped part and the second cone shaped part, based on the radial direction of the elastic transformation member.

2. The accessory of claim 1, wherein the elastic transformation member is integrally formed by injection-molding and made of a silicone material.

3. The accessory of claim 1, wherein the second cone-shaped part covers the first cone-shaped part when the elastic transformation member is transformed to a retraction mode, in which the coupling unit and the cover unit are close in distance to each other, from an extension mode that is a state in which the coupling unit and the cover unit are distant in distance from each other.

4. The accessory of claim 1, wherein the connecting part extends in a direction in which the coupling unit and the cover unit become close to or distant from each other, wherein two opposite ends of the connecting part are respectively connected to the first cone-shaped part and the second cone-shaped part, and wherein a thickness of a cross-section of the connecting part is larger than a thickness of a cross-section of the first cone-shaped part or a thickness of a cross-section of the second cone-shaped part, such that the connecting part presses and elastically transforms the first cone-shaped part and the second cone-shaped part when the elastic transformation member is transformed from the extension mode to the retraction mode.

5. The accessory of claim 1, wherein, in the retraction mode, the connecting part is surrounded by the side surfaces of each of the first and second cone-shaped parts, with one of the side surfaces being positioned closer to the connecting part than the other of the side surfaces based on the radial direction of the elastic transformation member.

6. The accessory of claim 1, wherein a distal part of the elastic transformation member coupled to the cover unit has a shape having a hollow center, wherein the cover unit comprises:

a top mount exposed through a hollow region of the distal part of the elastic transformation member;

a bonding film configured to cover an upper surface of the top mount; and a cover cap formed to have a larger outer diameter than the distal part and disposed to cover both the bonding film and the distal part, wherein a stepped portion bent downward is formed on a rim of the top mount, and an insertion portion formed by bending an end of the stepped portion in a radial direction is formed in the rim of the top mount, and wherein a top mount fixing groove into which the insertion portion of the top mount is inserted and fixed is formed in an inner peripheral surface of the distal part.

7. The accessory of claim 6, wherein an outer peripheral cover portion and a cap fixing protruding portion are formed on a lower surface of a rim of the cover cap, wherein the outer peripheral cover portion is formed as an inclined surface lowered in a radial direction to cover an entire upper end of the distal part, and formed to having a larger thickness than another portion of the cover cap, wherein the cap fixing protruding portion protrudes toward the distal part from a position closer to a center of the cover cap than the outer peripheral cover portion, wherein a cover cap fixing groove is formed in an upper portion of the distal part so that the cap fixing protruding portion is inserted into the cover cap fixing groove, and the cover cap is fixed, wherein the cap fixing protruding portion is provided as a plurality of cap fixing protruding portions positioned to be spaced apart from one another along a circumference of the cover cap, and wherein the cover cap fixing groove is formed to correspond to a position at which the cap fixing protruding portion is formed along the circumference of the distal part.

8. The accessory of claim 6, wherein a second magnet accommodation portion is formed at a center of the top mount and communicates with an internal space of the elastic transformation member, wherein a second magnet inserted into the second magnet accommodation portion has a rim portion protruding between an upper end and a lower end along an outer peripheral surface in a circumferential direction, wherein the second magnet accommodation portion has a protrusion, wherein the protrusion extends inward from an inner peripheral surface of a lower end of the second magnet accommodation portion to fix the second magnet, and wherein the protrusion is provided as a plurality of protrusions positioned to be spaced apart from one another in a circumferential direction of the second magnet accommodation portion.

9. The accessory of claim 8, wherein a magnet fitting portion is formed at an upper end of the second magnet accommodation portion, wherein the magnet fitting portion has a downward inclined surface formed at an end directed toward a center of the top mount to guide insertion of the second magnet, and fixes a second magnet seated in the second magnet accommodation portion, and wherein cut-out portions are formed at two opposite sides of the magnet fitting portion in a radial direction of the top mount.

10. The accessory of claim 1, wherein a proximal part of the elastic transformation member has a shape having a hollow center based on a position from the portable device or the casing, and wherein the coupling unit comprises:

a lower mount configured to cover a hollow region of the proximal part of the elastic transformation member;

a lower cap configured to fix a state in which a rim of the lower mount and a rim of the proximal part are tightly attached to each other; and a protective tape configured to cover the lower mount and a lower surface of the lower cap.

11. The accessory of claim 10, wherein the proximal part comprises:

a fixing blade portion formed along a circumference of the proximal part and disposed between the lower cap and the lower mount to fix the elastic transformation member to the coupling unit; and a plurality of coupling guide portions protruding in a radial direction from the fixing blade portion and positioned to be spaced apart from one another along a circumference of the fixing blade portion.

12. The accessory of claim 11, wherein the lower mount comprises:

a plurality of coupling mount portions, positioned to be spaced apart from one another along a circumference of the rim, and formed at a position corresponding to the coupling guide portion; and a tight fixing portion protruding between the coupling mount portions in the radial direction and configured to allow the fixing blade portion to be tightly attached and fixed to the lower surface of the lower cap.

13. The accessory of claim 12, wherein the lower cap is formed in a disk shape having a hollow hole formed at a center thereof, wherein the rim of the proximal part of the elastic transformation member is fitted and inserted into the hollow hole, wherein a first catching ring is formed on the lower surface of the lower cap, extends downward and inward wherein a second catching ring is formed at an end of the tight fixing portion, extends upward and outward, and being engaged with the first catching ring, and wherein the rim of the proximal part of the elastic transformation member is fixed by being tightly attached between the lower surface of the lower cap and an upper surface of the lower mount by the engagement between the first catching ring and the second catching ring.

14. The accessory of claim 10, wherein a first magnet accommodation portion is formed at a center of the lower mount and communicates with an internal space of the elastic transformation member, and wherein a first magnet inserted into the first magnet accommodation portion has a rim portion protruding between an upper end and a lower end along an outer peripheral surface in a circumferential direction.

15. The accessory of claim 14, wherein the first magnet accommodation portion has a protrusion, wherein the protrusion extends inward from an inner peripheral surface of an upper end of the first magnet accommodation portion to fix the first magnet, wherein the protrusion is provided as a plurality of protrusions positioned to be spaced apart from one another in a circumferential direction of the first magnet accommodation portion, wherein a magnet fitting portion is formed at a lower end of the first magnet accommodation portion, wherein the magnet fitting portion has an upward inclined surface provided at an end directed toward a center of the lower mount to guide insertion of the first magnet, and fixes the first magnet seated in the first magnet accommodation portion, and wherein cut-out portions are formed at two opposite sides of the magnet fitting portion in a radial direction of the lower mount.

16. An accessory for a portable device, the accessory comprising:

a coupling unit configured to be attachable to one surface of a portable device or one surface of a casing that surrounds the portable device;

an elastic transformation member connected to the coupling unit; and a cover unit connected to the elastic transformation member and configured such that a distance between the cover unit and the coupling unit is increased or decreased in accordance with elastic transformation of the elastic transformation member, wherein the elastic transformation member comprises:

a first cone-shaped part disposed close to the coupling unit and having a side surface formed as a convex curved surface;

a second cone-shaped part disposed close to the cover unit and having a side surface formed as a convex curved surface; and a connecting part configured to connect the first cone-shaped part and the second cone-shaped part, wherein an outer diameter of either the first cone-shaped part or the second cone-shaped part is larger than an outer diameter of the other, wherein a state in which the coupling unit and the cover unit become close to each other by the elastic transformation of the elastic transformation member is defined as a retraction mode, wherein a state in which the coupling unit and the cover unit become distant from each other by the elastic transformation of the elastic transformation member is defined as an extension mode, wherein the side surface of at least one of the first cone-shaped part and the second cone-shaped part is elastically transformed curvedly when the elastic transformation member is transformed from the extension mode to the retraction mode, wherein an inflection point at which a sign of a curvature is changed occurs on the side surface of the first cone-shaped part and the side surface of the second cone-shaped part when the elastic transformation member is transformed from the extension mode to the retraction mode, and wherein interference prevention slit grooves are respectively formed in an inner peripheral surface of the first cone-shaped part and an inner peripheral surface of the second cone-shaped part to prevent interference with at least one of the coupling unit and the cover unit in the retraction mode.

17. The accessory of claim 16, wherein a thickness of a cross-section of the first cone-shaped part and a thickness of a cross-section of the second cone-shaped part are smaller in regions in which the slit grooves are formed, than in peripheral regions of the first cone-shaped part and the second cone-shaped part, wherein the slit grooves are formed as closed-curve shapes in the inner peripheral surface of the first cone-shaped part and the inner peripheral surface of the second cone-shaped part, and wherein the slit groove is formed in a region in which the slit groove is spaced apart from the cover unit in the extension mode and moved to a position facing the cover unit when the elastic transformation member is elastically transformed to the retraction mode.

18. An accessory for a portable device, the accessory comprising:

a coupling unit configured to be attachable to one surface of a portable device or one surface of a casing that surrounds the portable device;

an elastic transformation member connected to the coupling unit; and a cover unit connected to the elastic transformation member and configured such that a distance between the cover unit and the coupling unit is increased or decreased in accordance with elastic transformation of the elastic transformation member, wherein the elastic transformation member comprises:

a first cone-shaped part disposed close to the coupling unit and having a side surface formed as a convex curved surface;

a second cone-shaped part disposed close to the cover unit and having a side surface formed as a convex curved surface; and a connecting part configured to connect the first cone-shaped part and the second cone-shaped part, wherein an outer diameter of either the first cone-shaped part or the second cone-shaped part is larger than an outer diameter of the other, wherein an internal space of the elastic transformation member is divided into a first region, a second region, and a third region, wherein the first region is defined as a region surrounded by the first cone-shaped part, the second region is defined as a region surrounded by the second cone-shaped part, and the third region is defined as an internal region in the connecting part, wherein a first magnet accommodation portion is provided in the coupling unit and opened to the first region, wherein a second magnet accommodation portion is provided in the cover unit and opened to the second region, and wherein when the elastic transformation member is transformed to a retraction mode that is a state in which the coupling unit and the cover unit are close each other, a first magnet provided in the first magnet accommodation portion and a second magnet provided in the second magnet accommodation portion become close to each other in a range in which an attractive force is applied therebetween, and the retraction mode is retained by the attractive force applied between the first magnet and the second magnet in a state where they are spaced apart from each other at a predetermined interval.

* * * * *